US010445071B2

(12) United States Patent
Fischer

(10) Patent No.: US 10,445,071 B2
(45) Date of Patent: Oct. 15, 2019

(54) COMPUTER-IMPLEMENTED METHOD FOR COMPUTER-AIDED GENERATION OF AN EXECUTABLE CONTROL PROGRAM, AND ALSO COMPUTER-IMPLEMENTED METHOD FOR COMPUTER-AIDED TRANSLATION OF A GRAPHICAL MODEL DESCRIBING THE FUNCTIONALITY OF A CONTROL PROGRAM

(71) Applicant: dSPACE digital signal processing and control engineering GmbH, Paderborn (DE)

(72) Inventor: Karsten Fischer, Paderborn (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 0 days.

(21) Appl. No.: 15/075,493

(22) Filed: Mar. 21, 2016

(65) Prior Publication Data

US 2016/0274873 A1 Sep. 22, 2016

(30) Foreign Application Priority Data

Mar. 19, 2015 (EP) .................................. 15159845

(51) Int. Cl.
G06F 8/35 (2018.01)
G05B 19/042 (2006.01)
G06F 8/30 (2018.01)

(52) U.S. Cl.
CPC ........... *G06F 8/35* (2013.01); *G05B 19/0426* (2013.01); *G06F 8/31* (2013.01)

(58) Field of Classification Search
None
See application file for complete search history.

(56) References Cited

U.S. PATENT DOCUMENTS 7,178,112 B1 2/2007 Ciolfi et al.
7,742,903 B2 6/2010 Ciolfi et al.
(Continued)

OTHER PUBLICATIONS

Hagendorf et al., "Meta-Model-based Estimation of Optimal System Variants with MATLAB/Simulink," SNE Technical Note, vol. 22, No. 1, pp. 7-14 (Apr. 2012).
(Continued)

*Primary Examiner* — Wynuel S Aquino
(74) *Attorney, Agent, or Firm* — Muncy, Geissler, Olds & Lowe, P.C.

(57) ABSTRACT

A computer-implemented method for computer-aided generation of an executable control program for controlling a control system with an electronic computing unit, wherein the functionality of the control program is at least partially described in a graphical model, and the graphical model includes at least one sub-model with at least one sub-functionality, wherein the graphical model is first translated into model code in a high-level programming language, and the model code is subsequently compiled into the control program that is executable on the control system. Manageability of sub-model functions of sub-models within a graphical model is improved by the means that the sub-model is translated into a sub-model code function in the high-level programming language, that the model is translated into comprehensive model code in the high-level programming language, and that the sub-model code function is called from the comprehensive model code by a pointer to the sub-model code function.

14 Claims, 6 Drawing Sheets

(56) References Cited

U.S. PATENT DOCUMENTS

| | | | |
|---|---|---|---|
| 9,128,783 B1* | 9/2015 | Warlock | G06F 9/542 |
| 9,250,873 B2 | 2/2016 | Fischer et al. | |
| 2014/0359566 A1* | 12/2014 | Avadhanula | G06F 8/35 |
| | | | 717/109 |
| 2014/0359569 A1* | 12/2014 | Avadhanula | G06F 8/35 |
| | | | 717/109 |
| 2016/0196119 A1* | 7/2016 | Yang | G06F 9/449 |
| | | | 717/107 |
| 2016/0274873 A1* | 9/2016 | Fischer | G05B 19/0426 |

OTHER PUBLICATIONS

Schubert et al., "Experiences with the new FMI Standard Selected Applications at Dresden University," pp. 1-9 (Jan. 31, 2011).

No Magic Inc., MagicDraw: Architecture Made Simple, Code Engineering 18.0 User Guide, pp. 1-305 (2014).

Stack Overflow, "UML Representation for C/C++ Function Pointers," pp. 1-6 (Dec. 2012).

Willert, "Interfaces in Rhapsody in C, Techletter No. 1," pp. 1-6.

Extended European Search Report for European Application No. 15159845.5 dated Sep. 25, 2015 with English translation.

Lars Haendel, "The Function Pointer Tutorials," at https://web.archive.org/20120322130436/http://www.newty.de/fpl/intro.html, pp. 1-13 (Mar. 22, 2012).

European Office Action dated May 6, 2018 issued by the European Patent Office in corresponding European application 15159845.5.

* cited by examiner

COMPUTER-IMPLEMENTED METHOD FOR COMPUTER-AIDED GENERATION OF AN EXECUTABLE CONTROL PROGRAM, AND ALSO COMPUTER-IMPLEMENTED METHOD FOR COMPUTER-AIDED TRANSLATION OF A GRAPHICAL MODEL DESCRIBING THE FUNCTIONALITY OF A CONTROL PROGRAM

This nonprovisional application claims priority under 35 U.S.C. § 119(a) to European Patent Application No. 15159845.5, which was filed in Europe on Mar. 19, 2015, and which is herein incorporated by reference.

BACKGROUND OF THE INVENTION

Field of the Invention

The invention relates to a computer-implemented method for computer-aided generation of an executable control program for controlling a control system with an electronic computing unit, wherein the functionality of the control program is at least partially described in a graphical model, and the graphical model includes at least one sub-model with at least one sub-functionality, wherein the graphical model is first translated into model code in a high-level programming language and the model code is subsequently compiled into the control program that is executable on the control system. In addition, the invention also relates to a computer-implemented method for computer-aided translation of a graphical model describing the functionality of a control program into model code in a high-level programming language, wherein the graphical model includes at least one sub-model with at least one sub-functionality.

Description of the Background Art

The previously described computer-implemented methods for generating an executable control program and model code from a graphical model have been established for years in the field of research using control systems, but especially in the technical development of control systems, and are used intensively in the automotive field, in the aerospace industry, and in other technical and industrial application areas as well, for example. The control systems are generally control units, which is to say small computers with an electronic computing unit (ECU), on which a real-time operating system is usually run. Control systems in the form of control units typically have a variety of I/O interfaces through which the control unit is connected with a physical technical process that is to be influenced, from which measured process variables are thus to be acquired, and that is acted upon by the output of control variables. Accordingly, the external interface to the process includes sensors and actuators.

Description of the functionality of control programs with the aid of graphical models has been known. The models are generally described in the form of block diagrams such as are known from system theory. A signal flow between the various blocks of the block diagram is specified here using signal lines, wherein the blocks contain a particular transfer functionality between their inputs and outputs, and the incoming signals are numerically subjected to this functionality. Graphical models of this type frequently comprise sub-models for hierarchical structuring (for the purpose of clarity), which in the case of block diagrams often have, in turn, the appearance of a block in which the sub-functionality of the sub-model is defined at a finer level of granularity using elementary blocks. One example of an established development environment for building block-based mathematical models is Matlab with Simulink from The MathWorks, Inc.

The use of graphical models for describing the functionality of the control program has the particular advantage that the modeling is relatively clear and intuitive. Above all, the subsequent automated translation of the graphical model into code in a high-level programming language—the model code—entails the advantage that error-prone manual programming/conversion of the modeled functionality into a high-level programming language can be eliminated, and content-related adaptations of the functionality of the control program can be made considerably more quickly and tested on the control system. In order to identify the origin—graphical model—of the content of the functionality of the generated code in the high-level programming language, the translated/generated code is referred to as "model code". This should not be confused with a text description/definition that may exist of the graphical model in a description language of the modeling environment.

Typically, the model code is then compiled (for reasons of efficiency) into an executable program for the computing unit of the control system by a compiler of the high-level programming language. However, it could also be executed on the control system by an interpreter or serve as input for generating a hardware circuit for control (hard-wired or for a field programmable gate array (FPGA)).

The executable control program is then loaded onto the control system, where it is executed—typically in real time—on the electronic computing unit. On the control system, the control program then implements a sampled-data system in the automatic control sense that is connected with the associated physical technical process in a fixed time interval or even using multiple time intervals/sampling times.

It is known in the conventional art that, for sub-models within a higher-level overall graphical model, during translation of the graphical model into model code in a high-level programming language—this is also called the code generation process—the individual sub-models are translated into functions in the high-level programming language. For example, if a graphical model R contains one sub-model V, then it would be possible to generate a comprehensive function r( . . . ) in which the call to the sub-model code function v( . . . ) that represents the sub-functionality of the sub-model takes place. In this implementation, the entire graphical model must be translated anew if, for example, a change is made within the graphical model, regardless of whether it is made inside or outside the sub-model V.

If there are multiple variants V1, V2 for the sub-functionality of the sub-model V, there are various possibilities in the conventional art for managing these variants of the sub-functionality of the sub-model V. What is then at question is where and when the decision for a specific variant of the sub-functionality should be made. This can take place, for example, during the translation of the graphical model—which is to say during the code generation—into the model code in a high-level programming language—the model code then only contains the valid variant of the sub-functionality selected beforehand. To make such a selection there are, for example, setting possibilities in the code generation options as described in U.S. Pat. No. 7,742,903 B2, which is incorporated herein by reference, or as described in the graphical modeling environment Simulink from The MathWorks, Inc.

It is also stated there that it is alternatively also possible for this to not take place until compilation of the model code if the variants of the sub-functionality contained in the graphical model or in the sub-model are surrounded by suitable preprocessor directives so that the choice of one of the possible variants of the sub-functionality can still be made at the time of compilation. The executable control program that then results is only capable of executing the variant of the sub-functionality of the sub-model that was chosen at the time of compilation, however.

In the first alternative described for managing variants of sub-functionalities, the entire code generation process and the compilation must be carried out anew when a variant is changed or when a different variant is chosen; in the second alternative, in contrast, only recompilation is required, although the generated model code as a whole is larger than in the first alternative because it includes all variants.

U.S. Pat. No. 9,250,873, which herein incorporated by reference, is related to inheritance of code generation options across nested sub models.

SUMMARY OF THE INVENTION

It is therefore an object of the present invention to develop and improve the methods explained above for computer-aided generation of an executable control program for controlling a control system and/or for computer-aided translation of a graphical model describing the functionality of a control program into model code in a high-level programming language such that it is easier to manage the handling of sub-functionalities of sub-models during translation into model code in a high-level programming language, and in particular it is also possible to manage variants of sub-functionalities of a sub-model in an easier way.

The object derived and stated above is attained in the initially described computer-implemented method for computer-aided generation of an executable control program firstly by the means that the sub-model is translated into a sub-model code function in the high-level programming language, that the model is translated into comprehensive model code in the high-level programming language, and that the sub-model code function is called from the comprehensive model code by means of a pointer to the sub-model code function (for example, the pointer is defined in the model code as a function parameter of a higher-level model code function).

When it is said here that comprehensive model code is generated for the model and a sub-model code function is generated for the sub-model, this is primarily saying something about the relationship of the model and sub-model. The model itself can in turn be a sub-model contained in a higher-level model; this is not important when considering the method according to the invention. It is thus not necessary for the graphical model to be a model at the highest hierarchy level. What is important is that the sub-model code function generated for the sub-model is called from the model code generated for the comprehensive model by means of a pointer to the sub-model code function, which makes possible a hitherto unknown modular decoupling of the model code generated from the graphical model and the sub-model code function.

In addition, this technique also permits simple modification and switching of the sub-functionality or a variant of the sub-functionality of sub-models without requiring regeneration of the comprehensive model code. This is especially advantageous for the development of control systems because it makes it possible to avoid, e.g., a code review of the comprehensive model code. Moreover, this measure achieves the result that the size of the generated code is reduced as a whole, and most notably it is possible to switch between variants of sub-functions even at the run time of the control program, something which previously required a repeated wholesale code generation for the graphical model with the activation of a different variant, or else a repeated compilation of the entire generated code with the use of preprocessor switches.

The pointers to functions used in accordance with an exemplary embodiment of the invention can also be referred to as function pointers, oftentimes in conjunction with the high-level programming language "C" or the object-oriented variant "C++". The comprehensive model code does not contain the definition of the sub-model code function, but instead only the call of a sub-model code function (an arbitrary sub-model code function, from this perspective) by means of the pointer, which normally points to the starting address of the referenced sub-model code function in the memory of the computing unit.

An exemplary embodiment of the computer-implemented method is characterized in that the sub-model code function that is called from the comprehensive model code by means of the pointer is code-generated in a separate module, which in particular is independent of the module in which the comprehensive model code was code-generated. The separate module can be a separate code file, in the case of the high-level programming language C can be a separate source and/or header file, but can also be a library, for example, that contains multiple (sub-)function definitions (e.g., variants of the sub-functionality).

As a result of the separate data storage, it is possible to avoid regeneration and recompilation of the sub-model code functions or else of the higher-level graphical model code in the event that changes are made to a sub-model or to the higher-level models or that additional sub-model (variants) are added, since the comprehensive model code only indirectly references the sub-model code function by means of a pointer, and does not call it by means of its name.

With regard to the management of variants, provision can be made in the computer-implemented method that the sub-model includes multiple variants of the sub-functionality and that each variant of the sub-functionality is translated into a sub-model code function variant in the high-level programming language. The possibility exists to code-generate each sub-model code function variant in a separate module, but alternatively it is also possible to code-generate all variants of the sub-functionality in one common module. The more granular the storage of the sub-model code function variants is, the less chance there is that changing one variant will require other variants to also be code-generated or compiled, which further improves the effect of calling sub-model code functions from the comprehensive model code by means of pointers. Unnecessarily extensive code reviews and tests can be avoided in this way.

In another embodiment of the method in the management of variants of the sub-functionality, provision is made that at least one conditional statement is generated in the comprehensive model code for selection of one of the sub-model code function variants by an appropriate pointer assignment, wherein a particular advantage resides in the fact that the conditional statement can also be evaluated at the run time of the control program; in the conventional art, case distinctions of this type are made at the time of code generation or compilation, but not at the run time of the executable control program.

An embodiment of the method according to the invention concerns the merging of code, in that identical sub-functionalities of sub-models are recognized and/or are identified by the user. In detail, the method that is enhanced in this regard is distinguished in that the graphical model includes at least two sub-models, wherein the sub-models have an identical sub-functionality fi and sub-functionalities f1, f2 that are different from one another, wherein the identical sub-functionality fi is translated into a sub-model code function fi—for simplicity's sake, identical labels are used here for the functionalities and the coded functions—, wherein the sub-functionalities f1, f2 that are different from one another are translated into different sub-model code functions f1, f2. To implement the overall functionality of the sub-models, an overall sub-model code function V calls the different sub-model code functions f1, f2 through a pointer or pointer parameter. Preferably, the overall sub-model code function also contains the identical sub-functionality fi of the two sub-models V1, V2, either as a fully formulated code sequence—inline—or else once again as a function call fi. The similarity of the two sub-models and their identical sub-functionality fi can be detected through known pattern recognition methods, for example as early as in the graphical model or in the description language of the graphical model. Methods of this nature are known ("pattern matching"), but these methods are not themselves the subject matter of the invention.

The calling of the different sub-model code functions f1, f2, which is already especially advantageous here, as well, for the above-mentioned reasons, can be improved still further with regard to an optimized code review by the means that the identical sub-functionality fi and the sub-functionalities f1, f2 that are different from one another are code-generated in separate modules, in particular the sub-functionalities f1, f2 that are different from one another are also code-generated in separate modules.

In another embodiment of the invention, it has proven to be advantageous that, if the graphical model includes at least two sub-models V1, V2, wherein each sub-model has multiple sub-model variants V11, V12, V21, V22, and the sub-model variants V11, V12, V21, V22 of each sub-model V1, V2 are called as a function of identical conditional statements, that the conditional identical statements are code-generated into a single, combined or common, compound statement. For the sub-model variants V11, V12, V21, V22 of the two sub-models V1, V2, sub-model code function variants v11, v12, v21, v22 are generated and the sub-model code function variants v11, v12, v21, v22 are then selected from the common compound statement by means of pointers to the sub-model code function variants—and are of course called during the program execution in the higher-level model function code. As a result of this measure, the switching point (or the associated code) is relocated out of the sub-model variants of the sub-models and is combined if applicable, for example in the model code located higher in the hierarchy (e.g., as a standalone switching function), thus on the whole saving code as well as run time, which is always very much of interest in time-critical sampled data systems.

The problem derived and stated at the outset is also attained in the above-described computer-implemented method for computer-aided translation of a graphical model describing the functionality of a control program into model code in a high-level programming language, in that the sub-model is translated into a sub-model code function in the high-level programming language, the model is translated into comprehensive model code in the high-level programming language, and the sub-model code function is called from the comprehensive model code by means of a pointer to the sub-model code function. All the steps of the previously explained computer-implemented method for generating an executable control program can readily be applied to this method.

The object is also attained with regard to each of the two aforementioned methods by one computer program product apiece with a computer program that has software for carrying out one of the above-described methods when the computer program is executed on a computer.

The object is also attained by a development environment having a computer, having an input, and having an output, wherein the previously described method for computer-aided generation of the executable control program for controlling a control system is executed on the computer, wherein the control system includes an electronic computing unit, wherein the functionality of the control program is at least partially described in a graphical model, and the graphical model includes at least one sub-model with at least one sub-functionality and is displayed on the display and can be edited with the input, wherein the graphical model is first translated into model code in a high-level programming language and the model code is subsequently compiled into the control program that is executable on the control system, wherein the sub-model is translated into a sub-model code function in the high-level programming language, the model is translated into comprehensive model code in the high-level programming language, and the sub-model code function is called from the comprehensive model code by means of a pointer to the sub-model code function.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
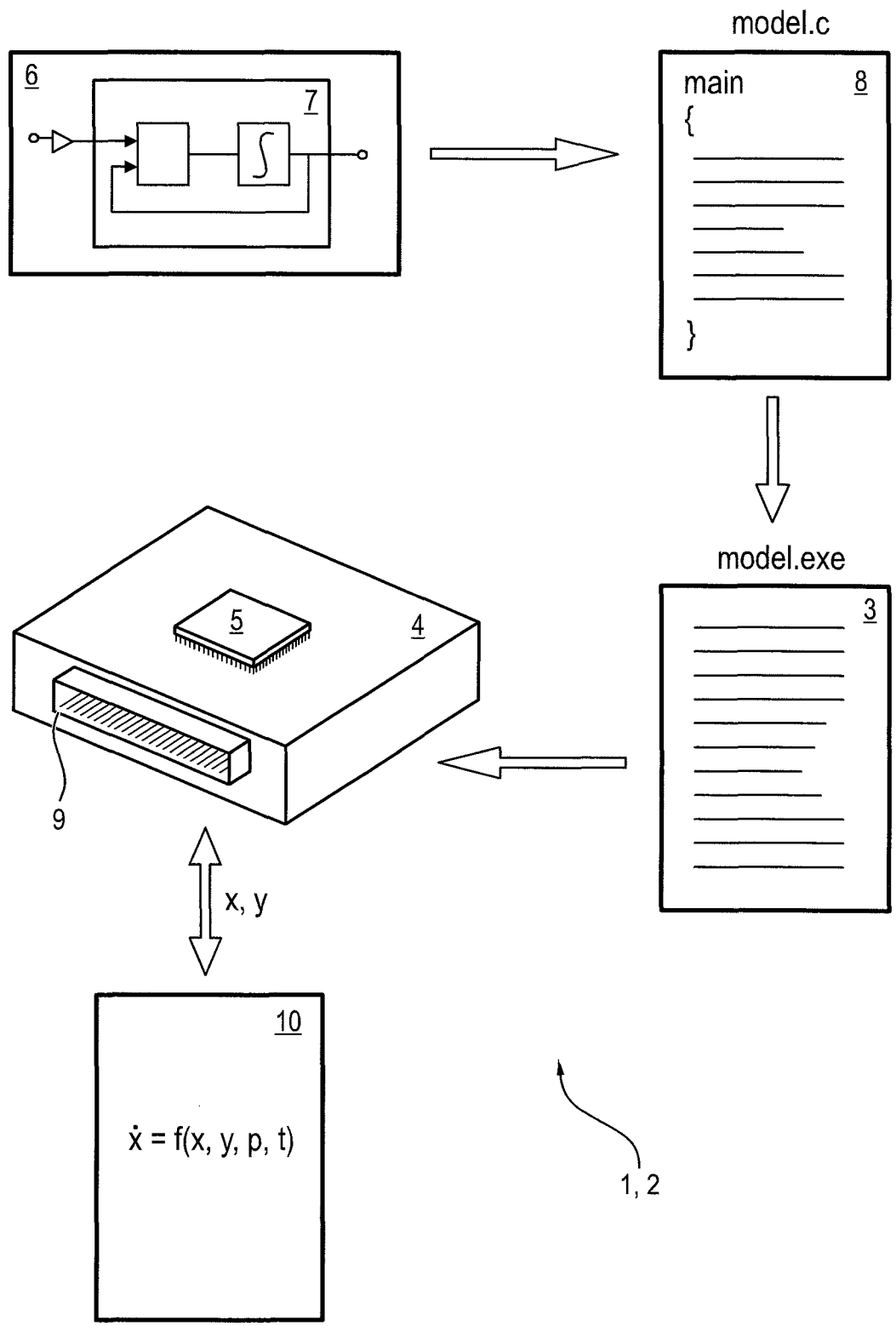
FIG. 1 shows the computer-implemented method known from the prior art for generating an executable control program, FIG. 2A schematically shows the method known from the prior art for managing variants in a graphical model at the time of code generation, FIG. 2B schematically shows the method known from the prior art for managing variants in a graphical model at the time of compilation of the previously generated model code, FIG. 3 schematically shows the method according to the invention in which the sub-model code function is called from the comprehensive model code by means of a function pointer.

FIG. 1 shows a computer-implemented method 1 for computer-aided generation of an executable control program 3 for controlling a control system 4, wherein the control system 4 has an electronic computing unit 5. The functionality of the control program 3 is at least partially described in a graphical model 6, wherein the graphical model 6 includes a sub-model 7 with a sub-functionality. The graphical model 6 is first translated into model code 8 in a high-level programming language. The model code 8 is subsequently compiled into the control program 3 that is executable on the control system 4, and normally the control program 3 is then loaded onto the control system 4 and executed there.

In the exemplary embodiment shown, the control system 4 is a control unit with a computing unit 5 based on a 32-bit processor, wherein the control unit 4 has a plurality of I/O interfaces 9. Through the I/O interfaces 9, the control system 4 is connected in an interactive manner to a physical technical process 10, which is to say it outputs control variables y to the physical technical process 10—for example to control actuators not shown in detail here—and receives information from the process 10 about state variables x, for example by acquiring these variables through measurement.

The process shown in FIG. 1 of the design of a closed loop/open loop controller with the aid of the graphical model 6, the subsequent translation of the graphical model 6 into the model code 8 in a high-level programming language, the compilation of the model code 8 into the executable control program 3, and the loading of the executable control program 3 onto the target hardware in the form of the control system 4, as well as the interaction of the control system 4 with the physical technical process 10 that subsequently takes place, is a development process that has become customary. Every intervention in the development process that influences the executable control program 3 thus also has an effect on the interaction with the physical technical process 10. For instance, optimization of the executable control program 3 has the result that faster sampling times are achieved on the control system 4 or more extensive computations can be achieved in the same sampling time.

FIG. 1 thus fundamentally also shows a computer-implemented method 2 for computer-aided translation of the graphical model 6 describing the functionality of the control program 3 into the model code 8 in a high-level programming language, wherein the graphical model 6 has at least one sub-model 7 with at least one sub-functionality.

Shown in FIG. 2A, firstly, is a graphical model 6, R with a sub-model 7, V that includes two alternative sub-model variants 11, V1, V2. The sub-functionalities connected with the variants 11, V1, V2 thus are never executed simultaneously, but rather only alternatively. FIG. 2A shows approaches known from the prior art for managing such variants 11, V1, V2 of the sub-functionality of the sub-model 7, V. In the first approach from FIG. 2A, the variant V1, V2 that is to be implemented is determined even before the translation of the graphical model 6, R into the model code 8. Accordingly, the generated model code 8 also contains only the call and the software implementation of the particular variant V1, V2 that has been chosen. In the model code examples 8 shown, r( ) stands for the function of the graphical model 6, with the start and end functionalities rs( ) and re( ) indicated by way of example. For the case in which the variant V1 of the sub-functionality has been chosen, a corresponding function is implemented in the model code 8, symbolized here by v1( ). The same applies for the previously made selection of the variant V2 of the sub-functionality of the sub-model 7, V, where in this case the functionality is implemented by a corresponding function v2( ). If a switch is to be made between the variants, then a new code generation process must be initiated with subsequent compilation, or else model codes 8 must be generated for all conceivable variants right from the start, which results in a substantial and undesirable extent of the model code 8, depending on the possible variants of a model 6, R.

Figures 2, 2B:
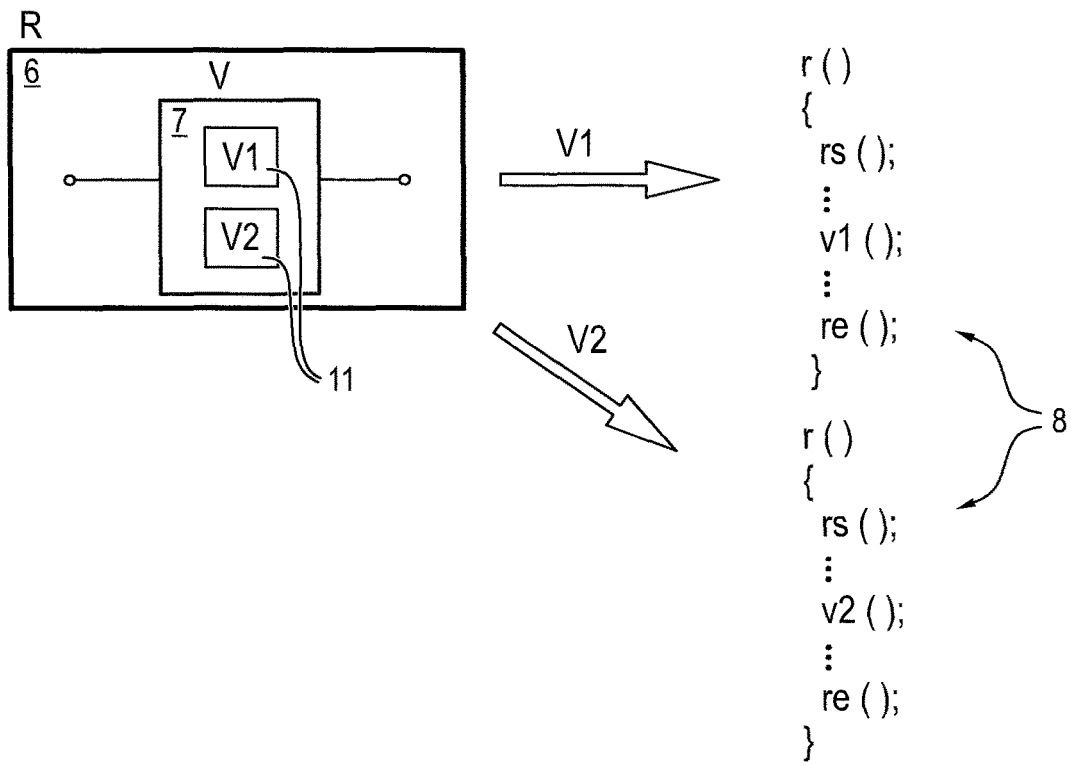

Shown in FIG. 2B is another prior art possibility for dealing with multiple variants 11, V1, V2 of a sub-functionality of a sub-model 7, V. Here the selection of one of the variants 11, V1, V2 of the sub-model 7, V does not take place at the time the model code 8 is generated, but instead at the time the model code 8 is compiled. In FIG. 2B, corresponding preprocessor directives have been used in the code example shown, such as are known from the programming language C, for example. While it is true that no code generation is required for activating a variant in this option for managing variants, recompilation of the model code 8 is nevertheless required. Moreover, the model code 8 in this management option is quite extensive, since it takes into account all possible variants 11, V1, V2 of sub-models 7, V of the graphical model 6, R.

Figure 3:
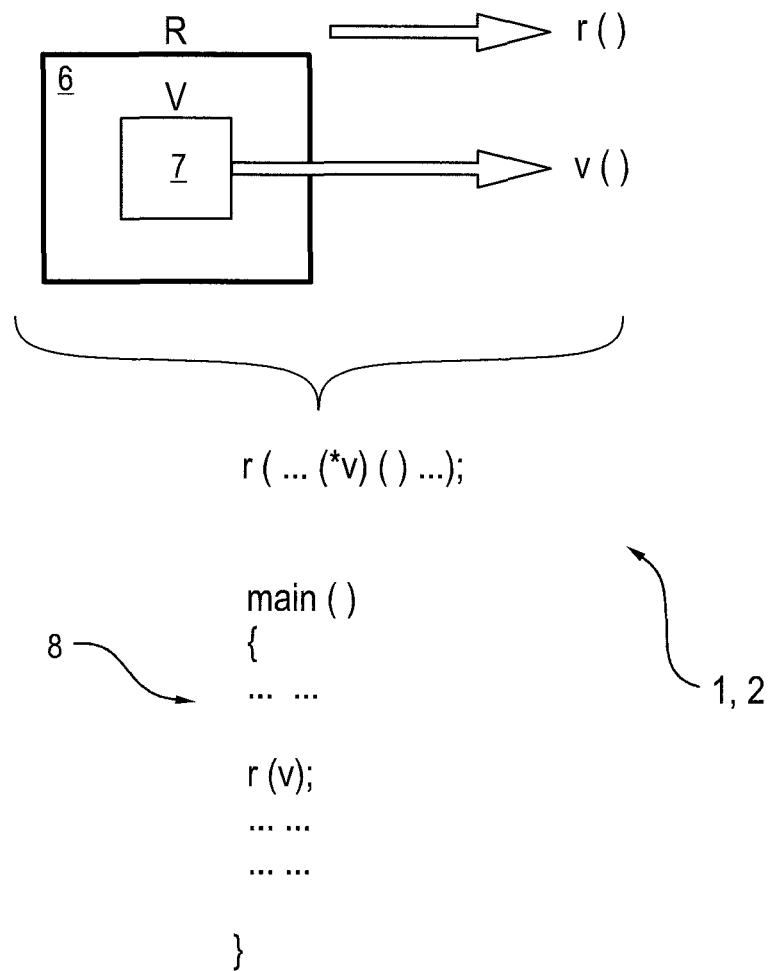

Shown in FIGS. 3 to 6 now are different aspects of the computer-implemented methods 1 and 2 according to the invention for computer-aided generation of an executable control program 3 and for computer-aided translation of a graphical model 6 in model code 8. Firstly, FIG. 3 shows a graphical model 6, R that includes a sub-model 7, V. According to the invention, the sub-model 7, V is translated into a sub-model code function v in the high-level programming language, which is represented in FIG. 3 as v( ) in accordance with typical notation for functions in high-level programming languages. Moreover, the model 6, R is translated into comprehensive model code 8 in the high-level programming language, which is represented in FIG. 3 as a function r( ).

As can be seen in the code example at the bottom in FIG. 3, the sub-model code function v( ) is then called from the comprehensive model code 8 in the form of the function r by means of a pointer to the sub-model code function v( ). This is illustrated by the declaration of the function r, which includes a function pointer (*v)( ) as parameter. Because of this measure it is very easy to decouple the graphical model 6, R and the sub-model 7, V in the generated code, since all that is now necessary is to refer to the functionality of the sub-model 7, V, or in other words the sub-model code function v, which is to say that it does not at first matter in the comprehensive model code 8 which specific function the passed pointer points to.

The functional decoupling of the comprehensive model code 8 from the sub-model code function v also makes it possible for the sub-model code function v that is called from the comprehensive model code 8 by means of a pointer to be code-generated in a separate module, which advantageously is also independent of the module in which the comprehensive model code 8 was code-generated. Here, it can easily be seen that the change in one of the modules, which may possibly result in a new review and a new test of this module, does not necessarily also have to result in a review and a new test of the code contained in the other module.

The computer-implemented method 1 from FIG. 4 differs from the method shown in FIG. 3 in that the graphical model 6, R includes a sub-model 7, V, wherein the sub-model 7, V includes multiple variants 11, V1, V2 of a sub-functionality and in that each variant 7, V1, V2 of the sub-functionality is translated into a sub-model code function variant v1, v2 in the high-level programming language, wherein the sub-model code function variants v1, v2 in FIG. 4 are once again represented in the notation v1( ) and v2( ) which is typical for the high-level programming language C, among others.

Figure 4:
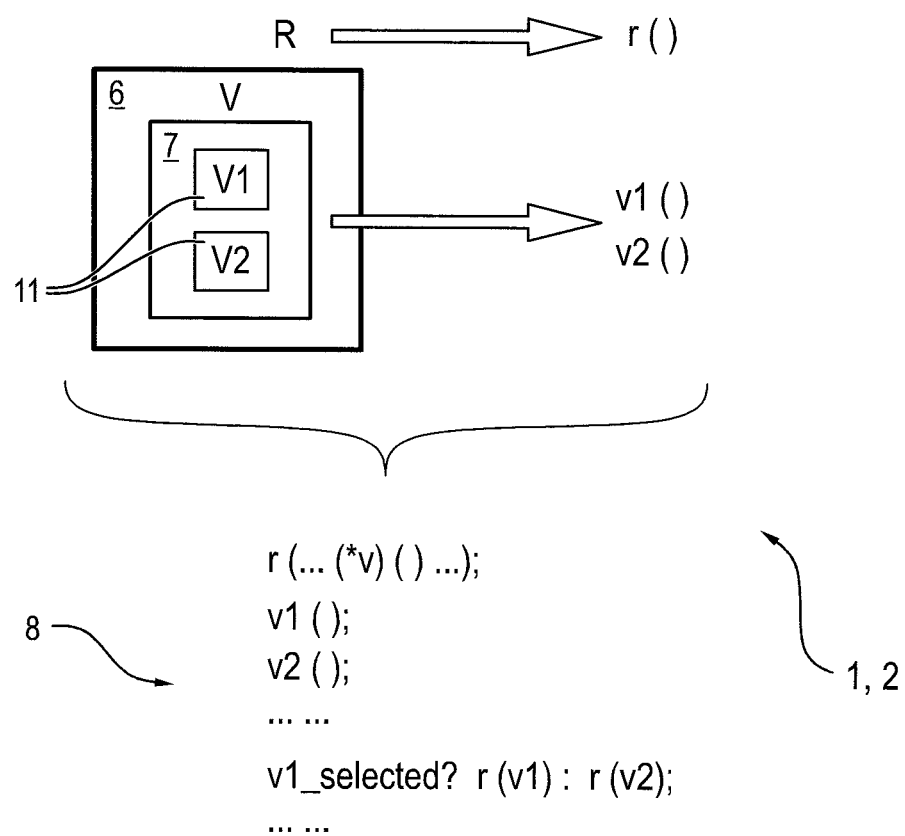
FIG. 4 shows a preferred embodiment of the method according to the invention for the management of multiple variants of a sub-model.

In the code excerpts at the bottom of FIG. 4, the declaration of the comprehensive model code 8 for the graphical model 6, R is once again shown in the form of the declaration of the function r, which is passed a function pointer (*v)( ) as a parameter. The sub-model code function variants v1, v2 in the high-level programming language are likewise declared in the appropriate location. It can be seen at the very bottom that it is possible to decide at the run time of the control program 3 which of the variants 11, V1, V2 of the sub-model 7, V should be executed.

The comprehensive model code 8 is in principle unaffected by a change to the sub-model 7, V or to the variants 11, V1, V2 of the sub-functionality of the sub-model 7, V. In the code example from FIG. 4 it is additionally evident that a conditional statement has been generated in the comprehensive model code 8 for selection of one of the sub-model code function variants v1, v2 by an appropriate pointer assignment. In the exemplary embodiment shown, the conditional ternary operator "?:" (test ? expression1:expression2) is used, wherein the expressions in calls to the variants v1, v2 of the sub-functionality of the sub-model from the comprehensive model code 8 take the form of the function r( ), wherein the function r( ) is passed pointers to the corresponding variants v1, v2 of the sub-functionality. The conditional call of r( ) with different function pointers as arguments shown in FIG. 4 is a component of the comprehensive model code 8, for example as follows:

```
m( )
{
...
    v1_selected? r(v1) : r(v2);
}
```

An alternative static generation of the comprehensive model code 8—for the variant V1, for example—could read as follows:

```
m( ) // m variant v1
{
...
    r(v1);
}
```

Figure 5:
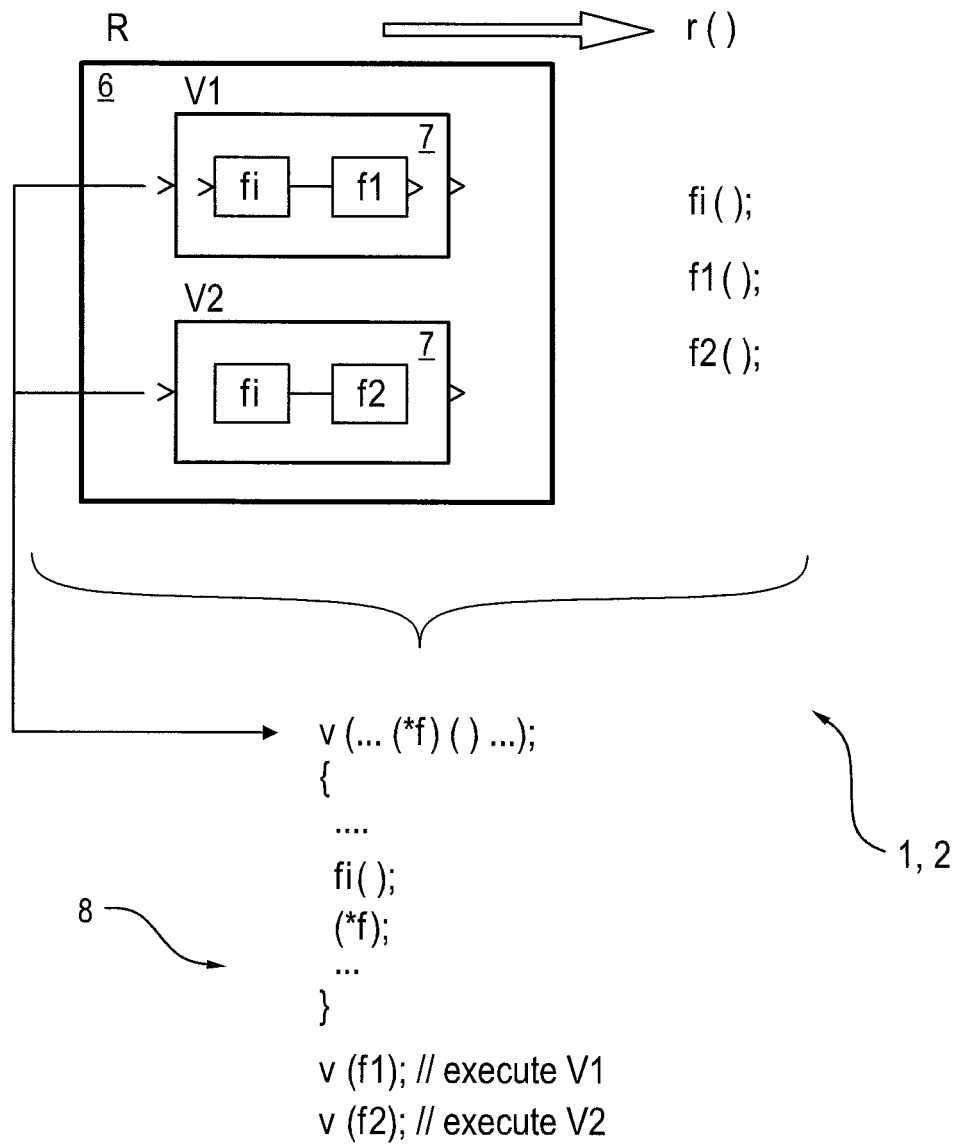
FIG. 5 shows another embodiment of the method according to the invention for the management of sub-models with identical and differing functional portions, and FIG. 6 schematically shows an enhancement of the method according to the invention for managing sub-systems with identical conditional statements.

FIG. 5 shows an especially advantageous enhancement of the previously described computer-implemented method 1 and of the method 2 as well. The graphical model 6, R has two sub-models V1, V2, although here they should not be understood as alternative variants, but rather as two sub-models V1, V2 that coexist simultaneously. The sub-models V1, V2 have an identical sub-functionality fi and sub-functionalities f1, f2 that are different from one another.

The identical sub-functionality fi of the two sub-models V1, V2 is translated into a single sub-model code function fi. The sub-functionalities f1, f2 that are different from one another, in contrast, are translated into different sub-model code functions f1, f2. In order to implement the overall functionality of the two sub-models V1, V2, now, an overall sub-model code function v is generated that calls the different sub-model code functions f1, f2 through a pointer.

Very compact code can be generated by means of this implementation of sub-models 7, V, which have an identical part fi and different parts f1, f2. Here, too, as a result of the modular structure of the model code 8, it is again possible to change parts of the model code—for example, one of the different sub-functionalities f1, f2—without at the same time reviewing the overall sub-model code function v again, since the latter does not change at all due to the ingenious passing of the function by means of a function pointer. In the overall sub-model code function v shown in FIG. 5, the identical sub-functionality fi is always called, and the desired sub-model V1 or V2 is implemented depending on the passed function pointer to one of the different sub-functionalities f1, f2.

Another possible implementation in conjunction with FIG. 5 could read as follows:

```
r( )
{
...
    v(f1);
...
    v(f2);
...
}
```

This makes it clear that both functionalities of the sub-models V1 and V2 are called within the function r( ) since the sub-models V1, V2 of course are not alternative variants, but instead are simultaneously effective sub-models V1 and V2.

Figure 6:
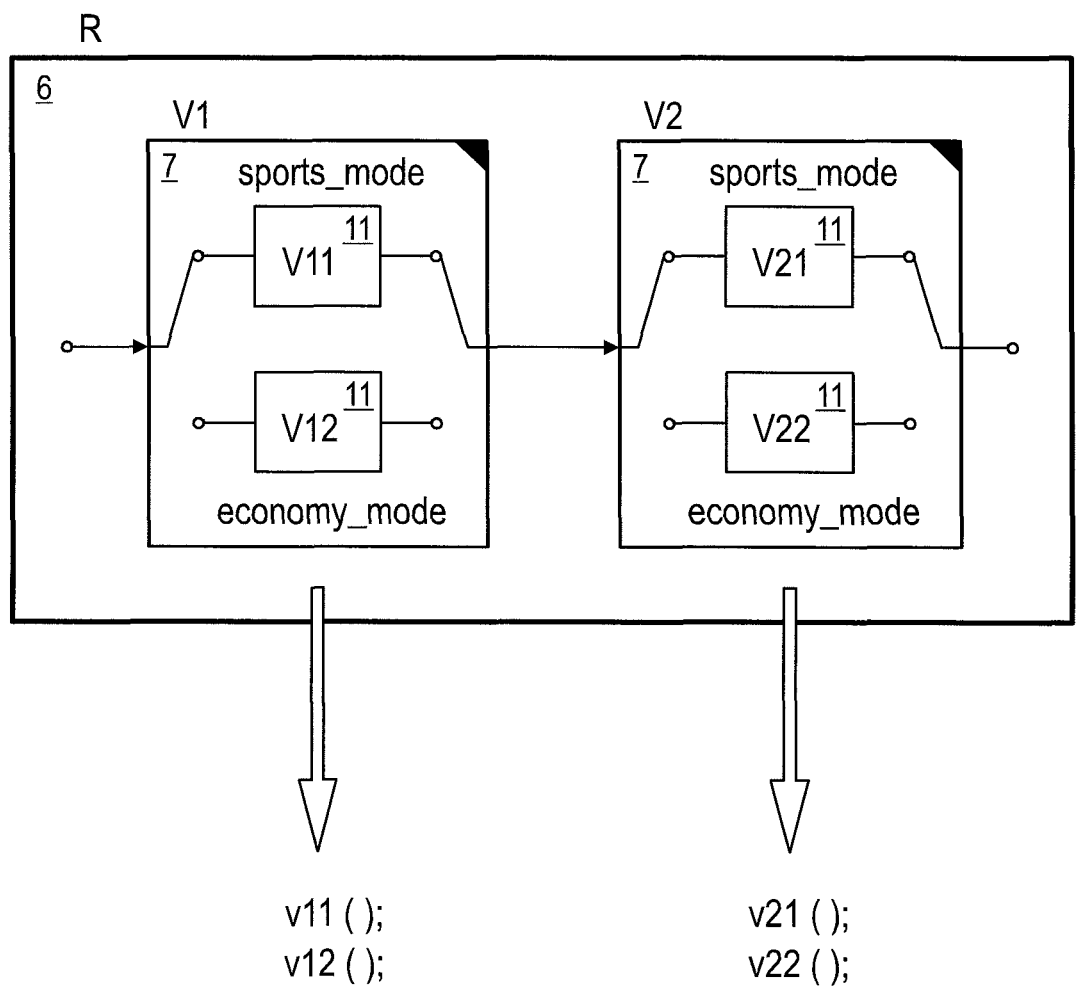

Another useful enhancement of the previously described method is shown in FIG. 6. The graphical model 6, R here has two sub-models V1, V2. Each of the sub-models V1, V2 additionally has multiple sub-model variants, the sub-model V1 has the sub-model variants V11 and V12, and the sub-model V2 has the sub-model variants V21 and V22. In each of the sub-models V1, V2, it is possible to switch between the two variants; in the present case, the choice between the variants depends on the choice of driving mode, "sports_mode" (V11, V21) or "economy_mode" (V12, V22). In other words, the sub-model variants V11, V12; V21, V22 of each sub-model V1, V2 are called as a function of identically conditional statements.

Now, the idea is that the conditional identical statements are combined into a single, common compound statement and are code-generated so that the number of conditional statements is reduced as a result. In this process, sub-model function variants v11, v12; v21, v22 are generated for the sub-model variants V11, V12; V21, V22 of the two sub-models V1, V2, and the sub-model code function variants v11, v12; v21, v22 are selected from the common compound conditional statement by means of pointers to the sub-model code function variants—and are also called at the run time of the executable control program 3.

In the following, one possible implementation of the combination of conditional statements is explained using a code example that can also be read in conjunction with the situation outlined in FIG. 6. In the code example below, two functions exist that are executed in very different sampling times. The function "Driving_Switch_100ms" is only executed every 100 ms, whereas the function "r_1ms" is executed 100 times as often, namely every millisecond (or rather, must be executed, for example because the control for the technical system requires this). During analysis of the underlying model, identical conditional statements for selection of the appropriate variants were recognized (namely the choice of a driving mode, in FIG. 6 the choice of "economy mode" or "sports mode") and combined into a single common identical compound statement, in the present case in the model code for the function "Driving_Switch_100ms", which is executed significantly more slowly.

The relocation of the common identical compound statement into the slower task makes sense because a switchover of the driving mode must take place in common for all functions, and the slowest function is thus the controlling factor for the fastest rate of change. Consequently, the driving mode "driving_mode" is first queried in the slow function "Driving_Switch_100ms". As a function of the query result ("sports_mode" or "economy_mode"), corresponding function pointers are set, namely either to the sub-model code function variants v11 and v21 or to the sub-model code function variants v12 and v22.

```
Driving_Switch_100ms( )      // 100 ms task
{
...
    driving_mode = read_hw_driving_mode_switch( );
    if(driving_mode == sports_mode){
       gp_v1 = &v11;    // set function pointers to sports variant
       gp_v2 = &v21;    // for several (sub-)functions
    }
    else
    if (driving_mode == economy_mode){
       gp_v1 = &v21;    // set function pointers to economy variant
       gp_v2 = &v22;    // for several (sub-)functions ...}
    }
r_1ms( )      // 1ms task
{
    (*gp_v1)(...);      // call sub-function for selected variant
    (*gp_v2)(...);      // via pointer; no if-code to check variant
}
```

As a result of the proposed procedure, 200 if/else statement executions in r1_ms (or in V1 and V2) per 100 ms run time are accordingly reduced to a single if/else statement execution because all conditional statements in the rapidly executed task r_1ms have been eliminated. The outlined solution is additionally distinguished by the fact that signal flow dependencies are taken into account during calling of the sub-model code function variants v11, v21; v21, v22 from the common identical compound statement by means of pointers, and the call sequence of the sub-model code function variants v11, v12; v21, v22 corresponds to the signal flow. This is evident from the fact that, in the fast task r_1ms, the sub-model code function variant v11, v12 of the first sub-model V1 is always executed before the sub-model code function variants v21, v22 of the second sub-model V22.

Yet another characteristic feature is shown in FIG. 6, namely that it is identified in the graphical model 6, R which sub-model code function v of a sub-model 7, V is called from the comprehensive model code 8 by means of a pointer to the sub-model code function v. In FIG. 6, the identification provides that the upper right-hand corners of the sub-models 7, V1, V2—or of the blocks representing them— have a shaded top right corner. In practice, which is to say in a computer-implemented modeling environment, this would be implemented through marking of the corresponding corners of sub-model blocks that could be accomplished by mouse click, for example.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A computer-implemented method for computer-aided generation of an executable control program for controlling a control system having a process interface and the control program being configured via the process interface such that at least one process quantity of a physical process is sensed by the control system and/or such that an output quantity for influencing the physical process is output by the control system, the control system having at least one electronic computing unit, wherein functionality of the control program is at least partially described in a graphical model, and the graphical model includes at least one sub-model with at least one sub-functionality, wherein the graphical model is first translated into model code in a high-level programming language, and the model code is subsequently compiled into the control program that is executable on the control system, the method comprising:

translating the sub-model into a sub-model code function coded in the high-level programming language;

translating the graphical model into comprehensive model code coded in the high-level programming language, the comprehensive model code accepting at least one pointer as a parameter;

compiling the comprehensive model code and the sub-model code function into the control program;

calling the compiled sub-model code function of the control program from the compiled comprehensive model code via a first pointer of the at least one pointer, the first pointer addressed to the compiled sub-model code function, wherein the first pointer points to a starting address of the compiled sub-model code function in a memory of the at least one electronic computing unit, wherein the graphical model includes at least two sub-models, wherein each of the sub-models have at least two sub-functionalities, wherein the at least two sub-functionalities in each of the at least two sub-models have a common sub-functionality with identical functionality, and each of the at least two sub-models have secondary sub-functionalities that are different from the sub-functionalities in other sub-models of the at least two sub-models, wherein the common sub-functionality in each of the sub-models is translated into a single common sub-model code function, wherein the secondary sub-functionalities of the at least two sub-models are translated into different secondary sub-model code functions, and wherein an overall sub-model code function combining the single common sub-model function and the different secondary sub-model functions, when compiled and executed, calls the different secondary sub-model code functions of each compiled sub-model code function through a second pointer in order to implement the secondary sub-functionalities of the sub-models.

2. The computer-implemented method from claim 1, wherein the compiled sub-model code function that is called from the compiled comprehensive model code via the first pointer is code-generated in a separate module, which is independent of a main module in which the comprehensive model code is code-generated.

3. The computer-implemented method according to claim 1, wherein at least one the at least one sub-model includes multiple variants of the at least one sub-functionality and wherein each variant of the multiple variants of the at least one sub-functionality is translated into a sub-model code function variant coded in the high-level programming language, each sub-model code function variant being code-generated in separate modules or all of the sub-model code function variants of the at least one sub-functionality are code-generated in one common module.

4. The computer-implemented method according to claim 3, wherein at least one conditional statement is generated in the comprehensive model code for selection of one variant of the sub-model code function variants by an appropriate pointer assignment, wherein the conditional statement is compiled and evaluated at a run time of the control program.

5. The computer-implemented method according to claim 1, wherein the identical sub-functionality and the secondary sub-functionalities that are different from one another are code-generated in separate modules, wherein the secondary sub-functionalities that are different from one another are also each code-generated in separate modules.

6. The computer-implemented method according to claim 1, wherein the graphical model includes at least two sub-models, wherein each sub-model has multiple sub-model variants, and the sub-model variants of each sub-model are referenced as a function of identical conditional statements in each sub-model, the conditional identical statements being code-generated together as a single, common identical compound statement,
wherein sub-model code function variants are generated for each of the sub-model variants of the at least two sub-models, and wherein, after compilation of the single, common identical compound statement and the sub-model code function variants, certain sub-model code function variants are selected and called from the common identical compound statement via pointers to the compiled sub-model code function variants.

7. The computer-implemented method according to claim 6, wherein signal flow dependencies are taken into account during calling of the sub-model code function variants from the common identical compound statement by means of pointers, and a call sequence of the sub-model code function variants corresponds to the signal flow.

8. The computer-implemented method according to claim 1, wherein the graphical model identifies, before code generation, which sub-model code function of each sub-model is called from the comprehensive model code via pointers to respective sub-model code functions.

9. A computer program product with a computer program that has software for carrying out the method according to claim 1, when the computer program is executed on a computer.

10. A computer-implemented method for computer-aided translation of a graphical model describing the functionality of a control program into model code in a high-level programming language, the method comprising:
providing the graphical model with at least one sub-model with at least one sub-functionality;
translating each of the at least one sub-model into a sub-model code function in the high-level programming language;
translating the graphical model into a comprehensive model code in the high-level programming language, the comprehensive model code accepting at least one pointer as a parameter;
compiling the at least one sub-model code function into a first executable;
compiling the comprehensive model code into a second executable; calling the first executable of the sub-model code function from the second executable of the comprehensive model code via a first pointer addressed to a first memory location having the first executable of the sub-model code function,
wherein the first pointer points to a starting address of the compiled sub-model code function in the first memory of an electronic computing unit,
wherein the graphical model includes at least two sub-model variants, wherein each of the sub-model variants have at least two sub-functionalities, wherein the at least two sub-functionalities in each of the at least two sub-model variants have a common sub-functionality with identical functionality, and each of the at least two sub-model variants have secondary sub-functionalities that are different from the sub-functionalities in other sub-model variants of the at least two sub-models,
wherein the common sub-functionality in each of the sub-model variants is translated into a single common sub-model code function, wherein the secondary sub-functionalities of the at least two sub-models are translated into different secondary sub-model code functions, and
wherein an overall sub-model code function combining the single common sub-model function and the different secondary sub-model functions, when compiled and executed, calls the different secondary sub-model code functions of each compiled sub-model code function through a second pointer in order to implement the secondary sub-functionalities of the sub-model variants.

11. A computer program product with a computer program that has software for carrying out the method according to claim 10, wherein the computer program is executed on a computer.

12. The computer-implemented method according to claim 10, wherein the first pointer is provided to the second executable of the comprehensive model code at run-time.

13. The computer-implemented method according to claim 12, wherein the steps of translating each of the at least one sub-model into a sub-model code function in the high-level programming language and translating the graphical model into a comprehensive model code in the high-level programming language are performed by a computer that automatically code-generates the comprehensive model code and sub-model code function from the graphical model and sub-model, respectively.

14. The computer-implemented method according to claim 10,
wherein each of the sub-model variants is accessible via the at least one pointer, and
wherein the first pointer provided at runtime selects a particular sub-model variant of the several sub-model variants for execution by the second executable of the comprehensive model code.

* * * * *